US007113272B2

(12) United States Patent
Bourely et al.

(10) Patent No.: US 7,113,272 B2
(45) Date of Patent: Sep. 26, 2006

(54) DEVICE AND METHOD FOR AUTOMATICALLY INSPECTING OBJECTS TRAVELING IN AN ESSENTIALLY MONOLAYER FLOW

(75) Inventors: Antoine Bourely, La Tour d'Aigues (FR); Roger Pellenc, Pertuis (FR)

(73) Assignee: Pellenc, Pertuis (FR)

( * ) Notice: Subject to any disclaimer, the term of this patent is extended or adjusted under 35 U.S.C. 154(b) by 263 days.

(21) Appl. No.: 10/472,145

(22) PCT Filed: Mar. 18, 2002

(86) PCT No.: PCT/FR02/00949

§ 371 (c)(1), (2), (4) Date: Sep. 22, 2003

(87) PCT Pub. No.: WO02/074457

PCT Pub. Date: Sep. 26, 2002

(65) Prior Publication Data

US 2004/0095571 A1 May 20, 2004

(30) Foreign Application Priority Data

Mar. 19, 2001 (FR) .................................. 01 03700

(51) Int. Cl.
*G01N 21/00* (2006.01)

(52) U.S. Cl. .............................. 356/237.1; 356/239.1; 356/239.4

(58) Field of Classification Search ..................... None
See application file for complete search history.

(56) References Cited

U.S. PATENT DOCUMENTS 4,280,624 A * 7/1981 Ford .......................... 209/524
4,367,405 A * 1/1983 Ford ...................... 250/223 B
4,655,590 A * 4/1987 Aagano et al. ............... 356/72
5,059,031 A * 10/1991 Hamel et al. ............... 356/428
5,675,419 A 10/1997 Van Den Bergh et al.
5,692,621 A 12/1997 Davis et al.
5,791,497 A 8/1998 Campbell et al.
6,177,999 B1 * 1/2001 Wurz et al. ................. 356/623
6,775,012 B1 * 8/2004 Wurz et al. ................. 356/608
2004/0246473 A1 * 12/2004 Hermary et al. ......... 356/237.1

FOREIGN PATENT DOCUMENTS

EP 0 497 747 8/1992
WO WO 96/03226 2/1996

* cited by examiner

*Primary Examiner*—Michael P. Stafira
(74) *Attorney, Agent, or Firm*—Young & Thompson

(57) ABSTRACT

A device and a method for automatically inspecting objects traveling in an essentially monolayer flow. The device comprises a detection unit through which the object flow passes, consisting of the following: elements for applying electromagnetic radiation in the direction of the plane of conveyance of the objects and defining a lighting plane, the intersection of the lighting plane and plane of conveyance defining a detection line; a receiver device periodically scanning each point on the detection line and receiving radiation reflected by an elementary measuring zone, the plane defined by the detection line and the optical input center being known as the scanning plane; elements for transmitting the reflected radiation. The radiation emitted is concentrated in the region of the lighting plane and the lighting plane and the scanning plane merge, whereupon the joint plane is inclined in relation to the normal of the plane of conveyance.

25 Claims, 6 Drawing Sheets

8'
8''
9
10'
10
c
b
D
3
7'
12
delta

DEVICE AND METHOD FOR AUTOMATICALLY INSPECTING OBJECTS TRAVELING IN AN ESSENTIALLY MONOLAYER FLOW

BACKGROUND OF THE INVENTION

The present invention relates to the characterisation and optionally the automatic sorting of objects, in particular recyclable domestic packagings, by their constituent materials and/or by their colour, the combination of a material or of a constituent substance and of a colour hereinafter being called a category.

It relates to a device and a method for automatically inspecting travelling objects with characterisation and discrimination according to their chemical composition.

The machine according to the invention is particularly but not exclusively suitable for inspection purposes and optionally for sorting, at high speed, various recyclable plastics packagings, in particular bottles made of PET, HDPE, PVC, PP and PS, as well as paper/cardboard, composite (drink packs) or metal packagings.

However, this machine may also be used for inspecting and discriminating any other objects or articles containing organic chemical compounds and travelling with a substantially single layer planar presentation such as, for example, fruits (discrimination by sugar content), and discrimination may be carried out on the basis of a major or minor chemical compound or of a plurality of chemical compounds.

In addition, said discrimination may end with separation of the flow of objects by sorting in categories or merely with counting and characterisation of said flow.

There are already numerous machines and numerous methods of the aforementioned type, in particular for sorting packagings according to their constituent material.

However, these known machines all have fairly serious drawbacks and significant limitations.

Therefore, the sorting of domestic packagings is still largely manual at present, particularly in European countries where sorting by material is demanded by the authorities responsible for recycling but also in other countries.

Significant automation of sorting has recently taken place in Germany, but in a very particular context, at least with respect to plastics materials. Sorting criteria do not concern the material but the shape (films, hollow bodies, or various mixed plastics). These existing machines therefore sort a "mixed plastics" category from papers/cardboards, after aeraulic presorting of the films and manual presorting of hollow bodies. Machines for the sorting of composite packagings or metal packagings are also found.

Existing machines differ greatly in terms of efficacy, depending on the type of mechanical preparation of the flow of objects to be sorted. Three main solutions may be distinguished:

- complete individualisation with a single object per receptacle, without grasping an object;
- a thread-form flow, the objects being aligned one behind the other;
- a planar flow, the objects being spread in bulk over a mat which is much larger than their largest dimension and being distributed in a single layer.

Only the last solution has proven suitable, from the points of view of efficacy and productivity, for products which are as heterogeneous as refuse, in particular domestic refuse. In fact:

- Complete individualisation has never been industrially proven. The prototypes developed with this type of presentation all ceased operating afterwards.
- The thread-type flow already existed in industrial over-sorting machines in which the main flow was uniform and over-sorting involved removing a small percentage of undesirable objects. Applied to a heterogeneous flow of packagings, these thread-type systems operated on particularly clean flows. However, these machines have a limited throughput and necessitate the presence of manual operators upstream of the machine to remove objects likely to disturb operation, in particular large sheets of plastic and large containers. Therefore, they do not constitute a satisfactory solution for automation of sorting and have had little success.
- Planar flows, on the other hand, have proven themselves as this is exactly the presentation of objects found in manual sorting. It is thus known how to carry it out simply in the context of domestic refuse, and the machines using this type of flow are suitable for bulk sorting conditions and have met with much greater success than the two other aforementioned types.

Only planar flow sorting, involving the currently most effective machines, will therefore be discussed hereinafter.

The document EP-A-0 706 838 in the name of the Applicant presents a sorting machine and method suitable for objects in a planar flow. This machine uses at least one artificial vision system to locate the objects and to recognise their shape and their colour, a robotic arm to grasp and handle the objects and at least one complementary sensor to recognise their constituent material. This complementary sensor is advantageously an infrared spectrometer.

This system has the advantage of being basically a multimaterial system since the main packagings are sorted by material and/or by colour and are distributed in a plurality of suitable containers. The same machine may therefore sort up to eight different categories. Furthermore, the individual gripping of the objects guarantees an excellent quality of sorting, typically one error per 1,000 sorted objects.

However, the sorting rate of this system is limited by the individual gripping of the sorted objects and does not exceed 60 to 100 kg/h per sorting module. The only way to increase this rate is to cascade a plurality of identical sorting modules, and this increases the overall bulk of the machine and its cost.

The document U.S. Pat. No. 5,260,576 presents a planar sorting machine which emits overhead the flow of electromagnetic radiation received by transmission below the flow of objects. The intensity of this radiation enables the materials to be distinguished according to their relative opacity in transmission. Thus, if the radiation consists of X-rays, this document mentions satisfactory separation of PVC which contains an atom of chlorine which is opaque to X-rays, in comparison with the other plastics which do not contain any, in particular PET. Depending on the result, a row of nozzles will or will not eject one of the classes of objects downwards.

However, this detection principle is too basic for complex cases: all objects have a degree of opacity, and it will be appreciated that multiple thicknesses of a material which is only slightly opaque (for example PET/polyethylene terephthalate) may not be distinguished from a single thickness of a more opaque different material (for example, PVC—polyvinyl chloride). There is therefore the risk of ejecting all these sparingly opaque objects at once in error. In addition, this system can only distinguish PVC from other plastics: it is incapable of distinguishing PET from HDPE (high density polyethylene) or PAN (polyacylonitrile). Existing machines according to this document have limited efficacy and low outputs (proportions of desired objects from among the ejected objects): of 10 to 30%. Finally, a significant drawback of the transmission assembly is that at least one of the two elements, the sensor or the transmitter, has to be below the flow. There is therefore a risk of recurrent soiling or blockage of the lower element, necessitating repeated interventions at relatively short intervals.

The document EP-A-0 776 257 describes a planar sorting machine which has a high throughput and is capable of recognising one material from a plurality of materials. The material to be recognised is selected at the time of construction of the machine by appropriate fixed calibration.

In this machine, mere infrared lighting is emitted overhead and the sensor is also placed on top, so it analyses the light which is scattered back vertically by the objects.

Reception is effected via a plane or semicircular concave mirror extending over the entire width of the mat, then by a polygonal rotating mirror. The point of measurement is therefore scanned cyclically over the entire width of the mat.

The light received from the measuring point is then divided by an assembly of semi-reflective mirrors in a plurality of flows. Each flow passes through an interferential filter centred over a specific wavelength, then ends at a detector. Each detector therefore measures the proportion of received light contained in the bandwidth of the filter. Analysis of the relative intensities measured by the various detectors allows a decision as to whether the material present at the point of measurement is or is not the desired material. The number of filters mentioned in this document is between 3 and 6.

The presence of a large-sized mirror of this type constitutes a fragile point of the overall structure, elongates the detection/ejection distance, increases the overall bulk of the detection station and is likely to lead to distortion and introduce inhomogeneities in the light flux recovered for analysis, leading to errors of detection.

In such architecture, the speed of detection is the main issue: there are 25 to 50 measuring zones per line, and 100 to 150 lines have to be analysed per second in view of the speed of circulation of the flow. The magnitude is therefore 5,000 measurements/s. Such a speed involves significant constraints:

- the detection algorithm must be sufficiently simple (therefore few operations and simple processing) to be carried out in real time;
- the reception electronics must be very fast;
- the quantity of light received must be sufficient in a very short time.

The detection algorithm has to carry out two-dimensional reconstitution of the objects to be sorted before proceeding to eject them, and this necessitates a relatively large distance between the detection zone and the ejection zone, increasing the risks of erroneous ejection owing to a movement of the objects between detection and ejection.

The aforementioned problem concerning the quantity of light is critical and explains why the machine according to this document can only recognise a predefined material:

- multimaterial recognition would necessitate the use of at least 8 to 16 wavelength ranges (or PLO) and not just 3 to 6 ranges;
- in addition, the widths of the PLOs, which are relatively large in the example mentioned (32 to 114 nm) would have to be reduced in a range of 5 to 20 nm since a larger number of PLOs has to be distinguished in the same spectral width.

The two effects are added together: the greatest number of PLOs would divide the quantity of light received by each filter by approximately 3; the reduced width of each PLO means that each filter would allow a fraction, which is about 5 times smaller, of the received light to pass through. To maintain the same level of signal, the lighting power required for the machine would therefore pass from one to 3×5=15 kW. Such a power would not be realistic (cost, energy consumption, heating).

The document WO 99/26734 presents a planar sorting machine having a high throughput, with architecture which is fairly close to the previous document but discloses multimaterial recognition.

To achieve this, this document approaches the problem of the quantity of light differently: it proposes a vision system upstream on the conveyor of infrared detection, this system being quite comparable to the one mentioned in the aforementioned document EP-A-0 706 838. This system allows each object present to be located and, in the region of infrared detection, allows a single measuring point which follows the travelling object to be controlled by a set of position-sensitive mirrors. The analysis time available becomes relatively long, of the order of 3 to 10 ms, as a single point is analysed per object. Implementation, although not specified, may therefore use known technology which is compatible with this analysis time. For example, a spectrometer with a bank of photodetectors (typically 256 components, each corresponding to a wavelength) with resolution of 4 to 6 nm per detector may be used.

However, this solution also has several drawbacks:

- it necessitates additional material, namely a vision system;
- it is dependent on the selection by vision of the point of spectrometric measurement on the object, and this may be awkward in the presence of labels or soiling;
- it is dependent on the immobility of the object on the mat: as the two detections are made on zones of about 1 m×1 m, the object moves by at least 1 m between its detection by vision and its detection by spectrometry, then by 0.5 m on average between its detection by spectrometry and its final ejection. Immobility is never ensured when the conveyor advances at 2.5 m/s, particularly if the objects are bottles which are likely to roll.

The machine described in this document is obviously more flexible but more expensive and much less effective than the previous one.

Finally, the document DE-A-1 96 09 916 describes a miniaturised spectrometer for a planar plastics sorting machine operating with a diffraction grating to spread the infrared spectrum over an output strip and a small number of sensors corresponding to wavelengths which are unevenly distributed in this output strip. It is mentioned in this document that 10 well-selected sensors rather than the 256 sensors of a conventional bank of photodiodes may suffice. However, each of these 10 sensors has an area equivalent to each sensor of a bank, in other words typically a rectangle of 30×250 $\mu m^2$. A surface of this type gathers little light and limits the speed of analysis to 200 measurements per second. Therefore, a spectrometer of this type cannot analyse all the points of a high-speed conveyor with the above-mentioned speeds and resolutions.

This last document therefore proposes the production of a line of identical parallel microspectrometers for analysing a planar flow. According to the inventor, the cost of a spectrometer would be minimised by microsystem production techniques, but the necessary resolution involves 25 to 50 spectrometers on the line to cover the width of the conveyor mat: the total cost, like the maintenance constraints, are therefore very high. In addition, few details are provided in this document on the production of such a machine, and there does not seem to be any machine of this type currently in operation.

In addition to the drawbacks and limitations inherent in each of the above-mentioned devices and methods, one major drawback which is common to all these devices and methods should be mentioned, namely their inability to reliably process objects having a significant height, for example of about 10 to 30 cm, owing to the inadequate intensity of applied radiation at this distance from the plane of conveyance Pc of the travelling objects, or owing to the inability to recover the radiation to be analysed or else for both the aforementioned reasons.

SUMMARY OF THE INVENTION

Thus, the main object of the present invention is to propose a machine and a method for inspecting and optionally sorting, which operates with a high through-put and for substantially single-layered flows of objects, this machine and this method being capable of discriminating reliably between objects having significant heights while being simple and economical to construct and use.

In addition, the invention should dispense with an independent vision system to locate the objects, minimise the number of sensors required, maintain good reliability, particularly in the event of sorting, when the objects move relative to the support transporting them and have optimised efficacy in exploitation of the emitted radiation.

The invention accordingly relates to a machine for automatically inspecting objects travelling substantially in a single layer on or over a plane of conveyance of a conveyor, for discriminating between these objects by their chemical composition, this machine comprising at least one detection station through or beneath which the flow of objects passes, this detection station comprising, in particular:

- means for applying electromagnetic radiation in the direction of the plane of conveyance, emitting said radiation so as to define a lighting plane, the intersection of said lighting plane and said plane of conveyance defining a detection line extending transversely to the direction of travel of the objects for the width of the conveyance,
- a receiver device periodically scanning each point on said detection line and receiving, all the time, radiation reflected by an elementary measuring zone located in the region of the point scanned at this instant, the plane defined by said detection line and the optical input centre of said device being known as the scanning plane,
- means for transmitting to at least one analysis device said radiation reflected in the region of the scanning elementary measuring zone, the machine being characterised in that the emitted radiation is concentrated in the region of the lighting plane and in that said lighting plane and the scanning plane coincide, the common plane being inclined to the perpendicular to the plane of conveyance.

These dispositions allow maximum application of radiation in the exploited zone for the acquisition and systematic correspondence of the illuminated zone and of the analysed zone, whatever the height of the objects in a range of heights defined by the dimensions of the machine and the sensitivity of the acquisition and analysis means.

Thus, the superimposition of the lighting and scanning (detection) planes gives a good depth of field and the inclination thereof to the plane of the analysed objects effectively eliminates the parasitic light formed by the specular reflection.

According to a preferred embodiment of the invention, the receiver device comprises a moving reflective member comprising or carrying the optical input centre, directly receiving the radiation reflected in the region of the scanning elementary measuring zone and having dimensions which are substantially equal to the dimensions of said elementary measuring zone which it displaces, preferably substantially greater.

Advantageously, the application means consist of broad spectrum lighting means, the applied radiation consisting of a mixture of electromagnetic radiation in the visible range and in the infrared range and said lighting means comprise members which concentrate the emitted radiation in the region of the plane of conveyance on a transverse detection strip periodically scanned by the elementary measuring zone and of which the longitudinal median axis corresponds to the detection line.

The use of broad spectrum lighting, for example of the halogen type, and of wavelengths of between 1,000 and 2,000 nm (for each emission point) allows chemical analysis of the objects disposed on the conveyor.

In order to even out the lighting of the detection zone, the means for application of radiation preferably consist of two mutually spaced application units disposed in an alignment which is transverse to the direction of travel of the objects, each unit comprising an elongate emission member combined with a member in the form of a profiled reflector of elliptical section.

According to a characteristic of the invention, each elongate emission member is positioned substantially in the region of the near focus of the elliptical reflector associated therewith, the means for applying radiation being positioned and the reflectors being shaped and dimensioned in such a way that the second, remote focus is located at a distance from the plane of conveyance substantially corresponding to the mean height of the objects to be sorted.

This lighting may therefore be focused on a large range of depths (typically about 200 mm).

The light intensity in the region of the detection zone, in particular in the region of its extreme portions, may optionally be further increased in that walls reflecting the radiation emitted by the application means are disposed along the lateral edges of the conveyor (for example, conveyor mat or belt), in particular in the region of the ends of the detection strip, and extend horizontally and vertically, substantially to the height of said application means.

According to a preferred variation of the invention, the receiver device is in the form of a receiver head located at a distance above the plane of conveyance and comprising or carrying, on the one hand, a moving reflective member in the form of a plane mirror (of which the geometric centre advantageously substantially coincides with the optical inlet centre), disposed substantially centrally relative to the plane of conveyance of the conveyor and oscillating by pivoting with a range which is sufficient for the moving elementary measuring zone to explore the entire detection strip during a half-oscillation and, on the other hand, a focusing means, for example in the form of a lens, for the fraction of radiation reflected by an elementary portion of the detection strip and transmitted by the oscillating mirror in the direction of said means, said head also comprising or carrying the end which has the inlet orifice of the means for transmitting said fraction of radiation, after it has been focused by the means, toward at least one spectral analysis device.

The moving elementary measuring zone which progressively scans the entire surface of the travelling conveying support is defined, in combination, by the characteristics of the inlet orifice of the transmission means and the characteristics of the focusing means and by their relative disposition, the focusing means and the successive transmission means being located outside the field of exploration of the oscillating mirror (defined by its optical or geometric centre) located in the scanning plane, the axis of alignment of the mirror/focusing means/inlet orifice being located in said plane containing said field.

The fraction of detection or measurement surface reflected by the oscillating mirror will advantageously be at least slightly greater in area than the elementary measuring zone centred relative thereto and of the same or a different shape.

To achieve a compact structure, the oscillating plane mirror forming the moving reflective member may advantageously be located between the two units forming the means for applying radiation and in a relative disposition which is such that said units do not interfere with the field of exploration of said mirror.

As mentioned hereinbefore, the scanning plane containing said field of exploration and the plane containing the focuses of the elliptical reflectors coincide and this coincidence of the illuminated zone and analysed zone allows optimum consideration of the objects having significant heights.

The mirror will preferably be located at a greater distance from the plane of conveyance than the units of application means, for example in the form of halogen lamps, however, it may also be disposed at the same height or even closer to this plane than said units without affecting the efficacy of the detection station.

According to a characteristic of the invention, the transmission means preferably consist of a bundle of optical fibres all or the majority of which are connected to an analysis device which splits or breaks down the reflected radiation into its various spectral components and determines the intensities of some of said components having wavelengths which are characteristic of the substances of the objects to be sorted, and of which a minority may advantageously be connected to an analysis device detecting the respective intensities of the three basic colours, said optical fibres having a square or rectangular section arrangement in the region of the inlet orifice.

According to a further advantageous characteristic of the invention, a first analysis device consists, on the one hand, of a spectrometer with a diffraction grating which breaks down the multispectral light flux received from the elementary measuring zone into its various constituent spectral components, in particular into the infrared range, on the other hand, of means for recovering and transmitting the elementary light fluxes corresponding to various unevenly spaced ranges of the spectrum, characterising the chemical substances and compounds of the objects to be discriminated, for example in the form of separate bundles of optical fibres and, finally, of photoelectric conversion means which deliver an analogue signal for each of said elementary light fluxes.

The multispectral light flux originating from the elementary measuring zone is introduced into the spectrometer in the region of an inlet slot and the elementary light fluxes are recovered in the region of outlet slots having a shape and dimensions identical to those of the inlet slot and positioned as a function of the dispersion factor and of the ranges of the spectrum to be recovered, the end portions for the egress of the fibres of the major component of the fibre bundle forming the transmission means and the end portions for the ingress of the optical fibres of the recovery and transmission means having identical linear arrangements and being mounted in the inlet slot and the outlet slots respectively.

To facilitate handling and installation of the recovery and transmission means without the risk of damaging them, the end portions for ingress of the optical fibres of the bundles forming the recovery and transmission means are mounted in thin plates provided with appropriate receiving recesses preferably combined with holding and locking back-plates so as to form assembly and positioning supports for said optical fibres in the body of the spectrometer.

Preferably, the body of the spectrometer comprises a rigid receiving and holding structure with locking for said supports, which enables them to be positioned by sliding and to be installed by stacking, optionally with insertion of appropriate shims so as to position said supports in the locations corresponding to the impact zones of the elementary light fluxes to be recorded.

An arrangement of this type allows rapid, easy and precise adaptation of the inspection machine for detecting different groups of materials, characterised by specific wavelength ranges which differ according to the type of objects and the selectivity to be employed.

Consequently, the first spectral analysis device consists mainly of a means for distributing the light without significant losses according to its constituent wavelengths and of a small number of detectors (10 to 20) in the form of photoelectric conversion means having a high unit surface area, each of the detectors being specific to a wavelength range (PLO), these PLOs conveniently being selected for robust simultaneous identification of a plurality of substances or chemical compounds corresponding, for example, to a plurality of materials.

In addition, a second analysis device which recognises the colour of the objects is combined with the previous device and takes a small portion of the light flux from the fibre bundle and sends it toward three sensors which are each sensitive to one of the basic colours, in other words red, green or blue.

To coordinate and control the various devices, members and components of the machine, the machine also comprises a unit for processing and managing operation of the detection station such as a computer controlling, in particular, the movement of the moving reflective member and optionally of the conveyor, sequencing the acquisition of the radiation reflected in the region of the moving elementary measuring zone and processing and evaluating the signals transmitted by the analysis devices, for example by comparison with programmed data, in order to determine the chemical composition of each of the inspected objects or the presence of a chemical substance in said objects, by correlating the results of said determination with determination of the spatial location of said objects.

According to a particularly preferred variation of the invention, the detection strip has the form of an elongate rectangular surface of small width extending perpendicularly to the median axis and transversely over the entire width of the plane of conveyance of the conveyor, for example in the form of a mat or belt of which the upper surface coincides with said plane of conveyance.

Thus, in the context of application to the sorting of objects and for a conveyor in the form of a belt travelling at about 2.5 m/s, the detection/discrimination distance may be limited to about 100 mm and this minimises the probability of an unstabilised object on the mat being displaced prior to discrimination thereof, which is manifested, for example, by the escape thereof.

The invention also relates to a machine for automatically sorting objects according to their chemical composition, these objects travelling substantially in a single layer on or over a conveyor, this sorting machine comprising an upstream detection station which is functionally coupled to a downstream station for active separation of said objects as a function of the results of the measurements and/or analyses effected by said detection station, characterised in that the detection station is a detection station as described hereinbefore.

Advantageously, the detection station or its unit for processing and managing operation transmit actuating signals to a control module for the ejection means in transverse alignment of the active separation station as a function of the results of said analyses, a salvo of actuating signals being emitted after each complete exploration of a transverse detection strip by the moving elementary measuring zone.

Preferably and to avoid, as far as possible, sorting errors due to displacement of the objects relative to the conveyor between detection and ejection, the detection line is located in the immediate vicinity of (for example at less than 30 cm from) the ejection means, for example by lifting, in the form of a row of nozzles which deliver jets of gas, preferably air.

The present invention also relates to a method for automatically inspecting objects travelling substantially in a single-layer over a plane of conveyance or surface of a conveyor, said method allowing discrimination between these objects by their chemical composition and involving:

- passing the flow of objects to be inspected through or beneath at least one detection station,
- emitting electromagnetic radiation toward the plane of conveyance via corresponding application means so as to define a lighting plane, the intersection of said lighting plane and said plane of conveyance defining a detection line extending transversely to the direction of travel of the objects,
- periodically scanning any point on said detection line via a receiver device which receives, at any instant, the radiation reflected by an elementary measuring zone located in the region of the point scanned at this instant, the plane defined by said section line and the optical input centre of said device being known as the scanning plane,
- transmitting said radiation reflected in the region of the scanning elementary measuring zone to at least one analysis device via appropriate transmission means, the method being characterised in that the radiation emitted is concentrated in the region of the lighting plane and in that said lighting plane and the scanning plane are combined, the common plane being inclined to the perpendicular to the plane of conveyance.

According to an advantageous characteristic of the invention, said method involves, in particular, concentrating the radiation, preferably in the visible and infrared range, in the region of the plane of conveyance on a transverse detection strip which is periodically scanned by the elementary measuring zone and of which the longitudinal median axis corresponds to the detection line, so as to obtain high intensity of radiation which is substantially uniform over the entire surface of said detection strip.

More precisely, said method may involve sequentially scanning the detection strip with the moving elementary measuring zone by pivoting oscillation of a plane mirror forming the reflective member, focusing the light flux originating from the elementary measuring zone on the inlet orifice of the transmission means in the form of a bundle of optical fibres, bringing the majority of the captured multispectral light flux toward the inlet slot of a spectrometer forming part of a first means of analysis, breaking down this light flux into its various elementary spectral components, recovering the light fluxes of some of these components corresponding to specific narrow wavelength ranges in the region of outlet slots and transmitting them via appropriate means to photoelectric conversion means in order to supply first measuring signals, simultaneously to optionally bring a small portion of the captured multispectral light flux toward a second analysis means determining the respective intensities of the three basic colours and supplying second measuring signals, processing said first and optionally second measuring signals in the region of a computerised processing and management unit, controlling, in particular, the movement of the moving reflective member, sequencing the acquisition of the radiation reflected in the region of the moving elementary measuring zone and processing and evaluating the signals transmitted by the analysis devices by comparison with programmed data in order to determine the chemical composition of each of the inspected objects or the presence of a chemical substance in said objects.

If the inspection method is used in a sorting machine as described hereinbefore, it may also involve causing the processing and management unit to transmit, as a function of the results of processing of the measuring signals, actuating signals to a module for controlling ejection means of a separation station located downstream of the detection station relative to the flow of objects and, finally, ejecting or not ejecting each of the various objects travelling on the supporting plane of conveyance of the conveyor as a function of the transmitted actuating signals.

According to an additional preferred characteristic of the invention, a salvo of actuating signals is emitted on completion of each scanning of the detection strip and processing of the corresponding measuring signals, taking into account the measuring signals of the previous scanning as the case may be.

BRIEF DESCRIPTION OF THE DRAWINGS

The present invention will be understood better by means of the following description which refers to a preferred embodiment given as a non-limiting example and explained with reference to the accompanying schematic drawings, in which.

DETAILED DESCRIPTION OF THE PREFERRED EMBODIMENTS

Figures 1, 1A:
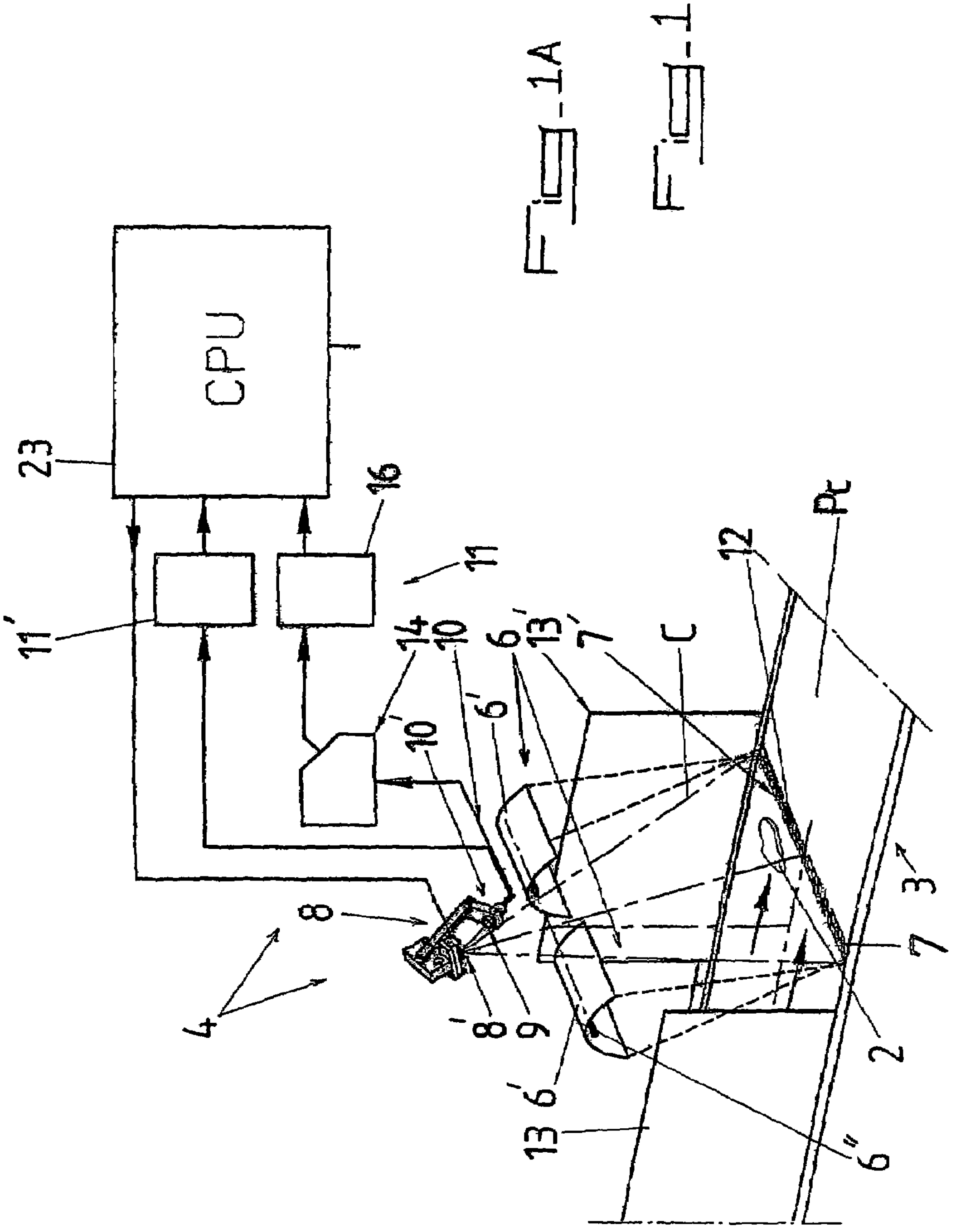
FIG. 1A is a schematic view of an automatic inspection machine according to the invention.
Figures 1, 1B:
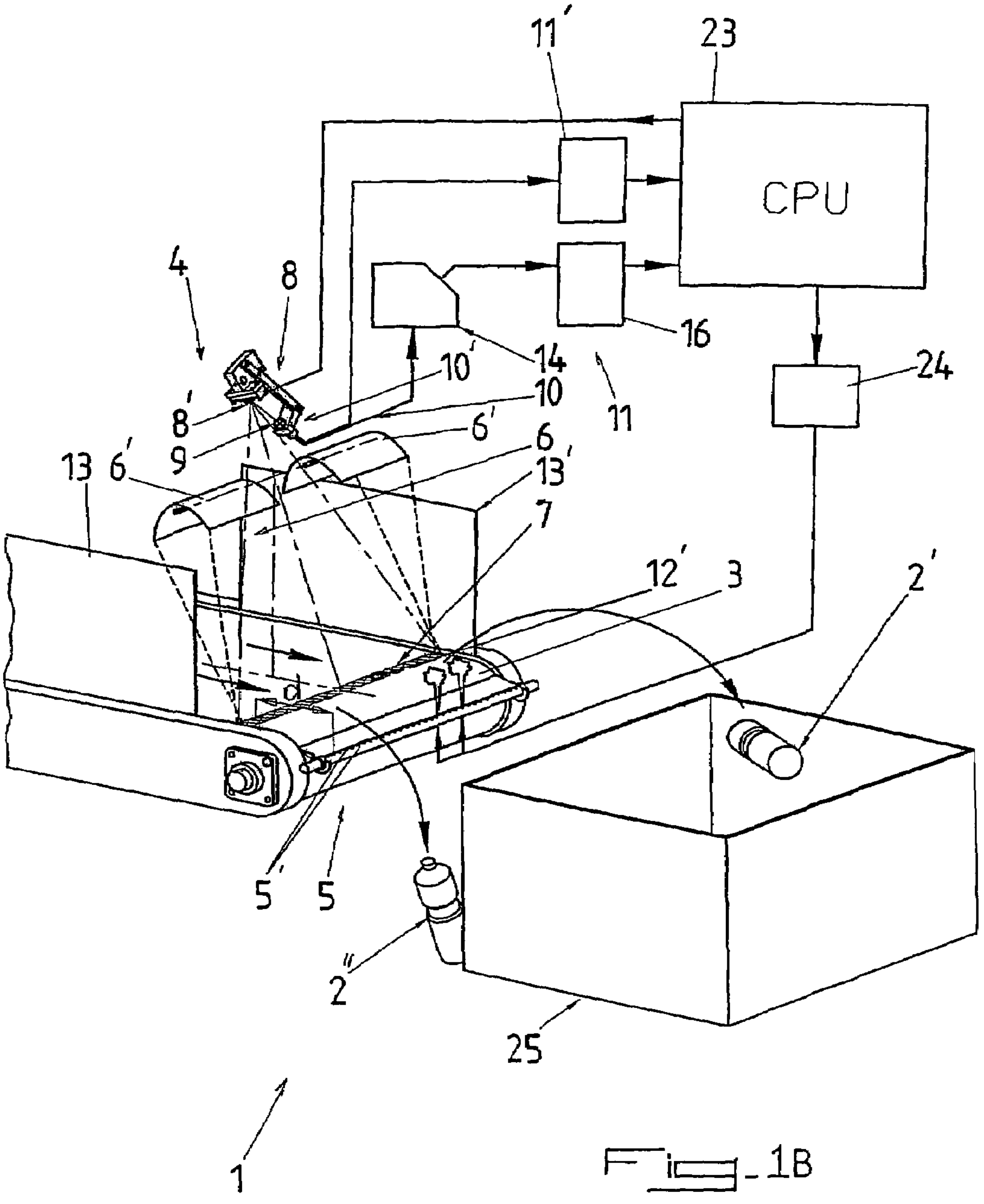
FIG. 1B is a partial schematic view of an automatic sorting machine according to the invention equipped, in particular, with an upstream detection station and a downstream separation station.

As shown in the figures of the accompanying drawings, and more particularly FIGS. 1 to 4, the machine for automatically inspecting objects 2 comprises at least one detection station 4 through or beneath which the flow of objects 2 passes, this detection station 4 comprising, in particular:

- means 6 for applying electromagnetic radiation in the direction of the plane of conveyance Pc of the conveyor 3, emitting said radiation so as to define a lighting plane Pe, the intersection of said lighting plane Pe and said plane of conveyance Pc defining a detection line 7 extending transversely to the direction of travel of the objects 2,
- a receiver device 8 periodically scanning each point on said detection line 7 and receiving radiation reflected by an elementary measuring zone 12 located in the region of the point scanned at this instant, the plane defined by said detection line 7 and the optical input centre 8" of said device being known as the scanning plane Pb,
- means 10 for transmitting said radiation reflected in the region of the scanning elementary measuring zone 12 to at least one analysis device 11, 11'.

According to the invention the emitted radiation is concentrated in the region of the lighting plane Pe and said lighting plane Pe and the scanning plane Pb coincide, the common plane Pe, Pb being inclined to the perpendicular D to the plane of conveyance Pc. This last arrangement allows specular reflection, in particular, to be eliminated.

The term "transverse" in relation to the detection line 7 denotes an extension over the entire width of the plane of conveyance Pc defined by the conveyor 3, preferably but not exclusively rectilinearly and perpendicularly to the direction of travel of the objects 2.

The plane of conveyance Pc, in the case of a planar conveying support, at the surface thereof and, in the case of non-planar supports, such as wheels mounted on chains (for individualised transport, for example for fruits) will correspond to a median plane characterising the travel of said objects.

It will be appreciated that the following description corresponds to a practical, non-limiting, embodiment of a sorting machine containing an inspection machine according to the invention and explained with reference to the accompanying FIGS. 1 to 8.

It will also be appreciated that the detection station 4 is identical in these two machines, the sorting machine also comprising a separation station 5.

FIG. 1 shows the general structure of the machine 1 for automatic sorting by chemical composition or substance. The objects 2 travel at high speed (2 to 3 m/s) onto a conveyance means or conveyor 3 so that they are substantially spread in a single layer. The surface of the conveyor 3 is dark and its constituent material (generally matt black rubber) is selected so as to be different from the materials or chemical compounds to be recognised.

These objects 2 pass through a detection region defined in the area of a detection station 4. This region is substantially delimited by lighting means 6 having a broad (visible and infrared) spectrum, which concentrate the light flux via reflectors 6' so as to markedly illuminate a zone 7' in the form of a narrow strip for effective detection, of which the width is 25 to 40 mm.

The zone 7' is analysed at high speed using an oscillating mirror 8' which is controlled by a computer 23 and cyclically directs the measurement toward each of the constituent elementary zones 12' of the zone 7'. A complete scanning cycle of the zone 7' takes approximately 8 ms. During this period, the conveyor 3 has advanced by a distance substantially equal to the width of said zone 7' so there is no detection "hole": every point of the conveyor 3 or of the travelling plane of conveyance Pc is analysed.

The light collected by the mirror 8' is focused by a lens forming a focusing means 9 on the inlet orifice 10' of a bundle 10 of optical fibres 10". The bundle 10 is subdivided into two portions: the first portion brings the majority of the light flux to a spectrometer 14 forming part of a first analysis device 11 and subdividing this portion of flux according to its constituent wavelengths in the near infrared range (NIR). A small number n of suitably selected PLOs (wavelength ranges) is transmitted to a module containing conversion means 16 in the form of photodiodes NIR having a large unit surface area and to an amplification stage. This module converts the light signals into the same number of analogue electrical signals which are then analysed by the computer 23.

The second portion of the bundle 10 is brought to a second analysis device 11' corresponding to a colour detection module. This module allows the red, green and blue components to be isolated by filtration and then allows the light signals to be converted into electric signals and to be amplified. After conversion, the output signals are also analysed by the computer 23.

The computer 23 combines all the previous information so that categories of objects to be ejected or not ejected can be defined, and thus controls the separation station 5 and each of the ejection means 5' in the form of nozzles in a row, by means of a control module 24.

The blown objects 2' end up in a receptacle 25 whereas the unblown objects 2" fall directly in front of this receptacle. Obviously, this arrangement is not the only solution: the nozzles 5' could just as well be placed above the conveyor 3 and thus blow down the objects 2' to be separated. This second configuration has advantages in certain applications.

A first decisive advantage of the machine 1 is that the device for receiving reflected light (mirror 8' and lens 9' assembly) does not extend physically over the entire width of the plane of conveyance Pc corresponding, for example, to the surface of a mat of a conveyor 3, but is a single device and is installed only in the centre of the median line of the conveyor 3. This prevents unevenness between various receiving points, which would impair the uniformity of the signal through the detection zone 7'.

A second decisive advantage of the geometry of the machine 1 is that a detection zone is placed as close as possible to the row of ejection nozzles 5'. The detection/ejection distance d may be limited by appropriate computing means, to about 100 mm, and this minimises the probability of an unstabilised object on the mat being displaced prior to the ejection thereof. It is limited only by the software processing time which is very fast as it relates to the information from a single line of measurements, or possibly only two adjacent lines. This distance is much smaller than the distance in the previously described known planar flux machines.

A person skilled in the art will note that such a small distance d does not allow two-dimensional analysis of each object prior to a decision: in the case of an elongate object such as a 300 mm long bottle, the decision to actuate the nozzles 5' on the leading end of the object must be taken before the trailing end of the same object has been completely analysed. However, this limitation does not significantly impair detection or ejection.

Figure 3:
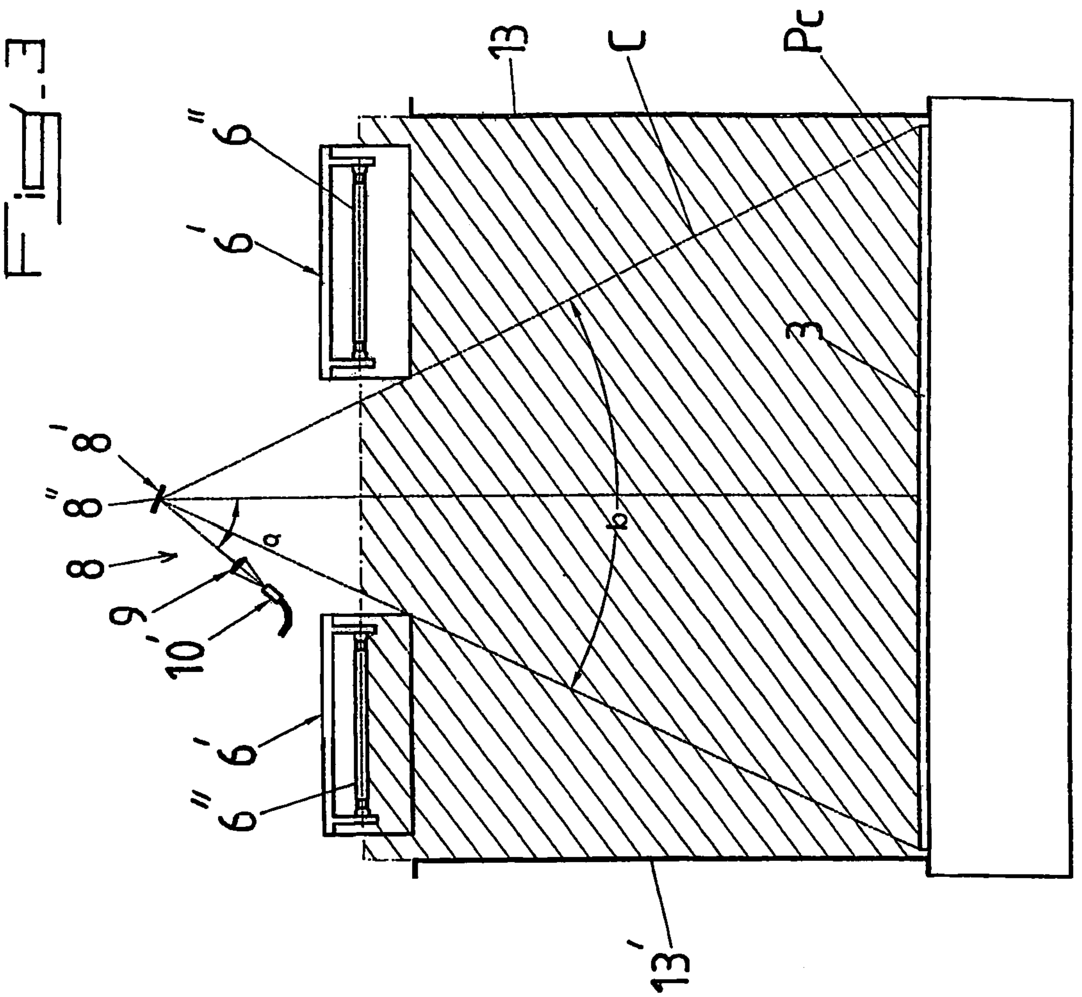
FIG. 3 is a partial transparent view in a direction opposed to the direction of travel of the conveyor means, of some of the machines shown in FIG. 1.
Figure 2:
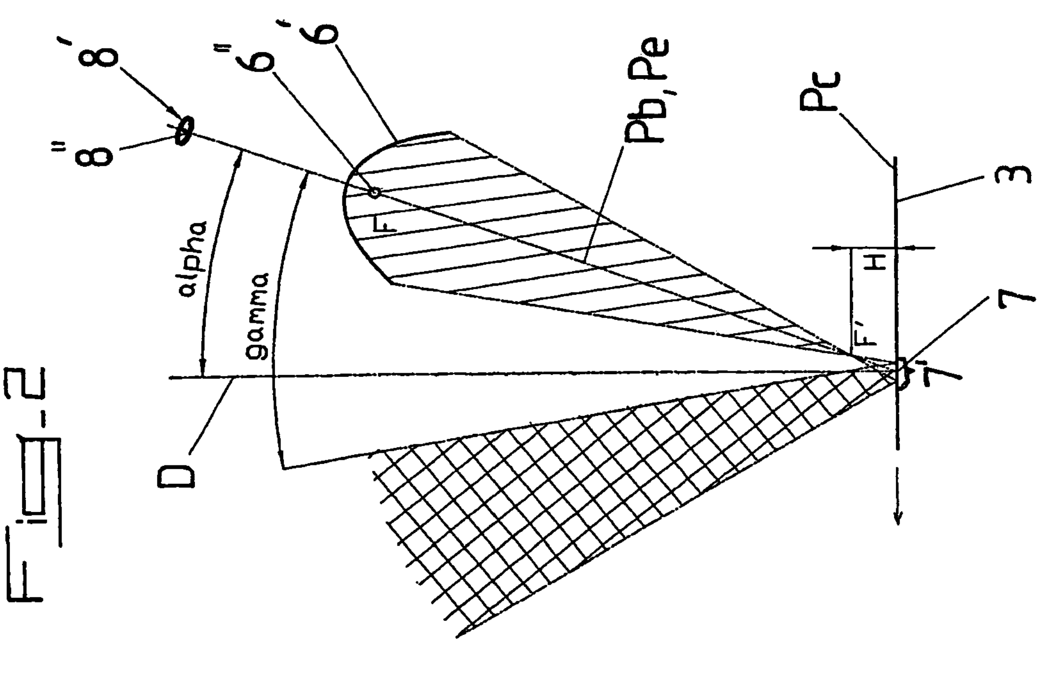
FIG. 2 is a schematic lateral elevation showing the inclination of the lighting means and of the reflecting means of the receiver head forming part of the detection station.

Referring in particular to FIGS. 1, 2 and 3 of the accompanying drawings, the lighting means will now be described in more detail.

The desired aim is to bring a maximum of light onto the detection zone 7' with the constraint that the lamps must be sufficiently far removed from the circulating objects 2 to allow these objects to circulate without interference. Approximately 50 cm between lamps and mats is desired. The amount of light is evaluated summarily in electric W/cm$^2$, with reference to a halogen lamp of colour temperature 3400 K.

From among the various possible lighting technologies, a set of stationary halogen lamps has been selected as this is the simplest, most widely used solution. Conventionally, however, industrial spotlights which significantly disperse the light are used.

The use of these commercial spotlights, even with a small angular aperture, necessitates many individual lamps and ends up with a low density of lighting.

To overcome the drawbacks associated with these known means, the inventors have developed lighting based on fine halogen tubes 6' as emission members which are aligned at the same height above the mat 3 and associated with elliptical reflectors 6'. A reflector 6' of this type allows the light to be focused perfectly on the other focus F' if the halogen tube 6" is placed at one of its focuses F. To obtain dimensions compatible with the machine 1 in its practical embodiment, the ellipse should have the following parameters:

semi major axis a=300 to 400 mm eccentricities e of about 85 to 92%.

Manufacture of the reflectors 6' must be very precise for good operation, but it is easier than that of conventional reflectors with circular symmetry such as parabolic mirrors. A developable surface which may be produced by folding is obtained in this case.

Preferably, the machine is assembled in such a way that F' is placed a few centimeters above the conveyor mat 3 at a height (H) corresponding to the average thickness of the travelling objects (H=25 to 50 mm).

With an embodiment of the lighting means 6 as mentioned hereinbefore, the inventors have found that the best intensity distribution is obtained by using only two fairly long reflectors 6' separated by a vacuum, as shown in FIG. 3. In addition, to avoid losses of light at the ends of the mat 3, vertical planar reflectors or reflective walls 13 and 13' are added at these ends, if necessary. These ends return the light toward the mat.

A simple, inexpensive, layout with a small number of lamps is thus obtained and all of the light is concentrated on a narrow strip to be analysed: 800 mm×40 mm, containing the detection zone 7' and centred thereon.

With two members of 100 electric W, the mean density obtained is $2\times1000/(80\times4)\approx6$ W/cm$^2$, that is about 60 times greater than the daytime sun. Such a concentration is compatible only with a mat 3 which moves at high speed to prevent the burning thereof. Electric safety devices are provided to shut off the lighting automatically in the event of a stoppage of said mat.

Figures 4, 4A, 4B, 4C, 4D:
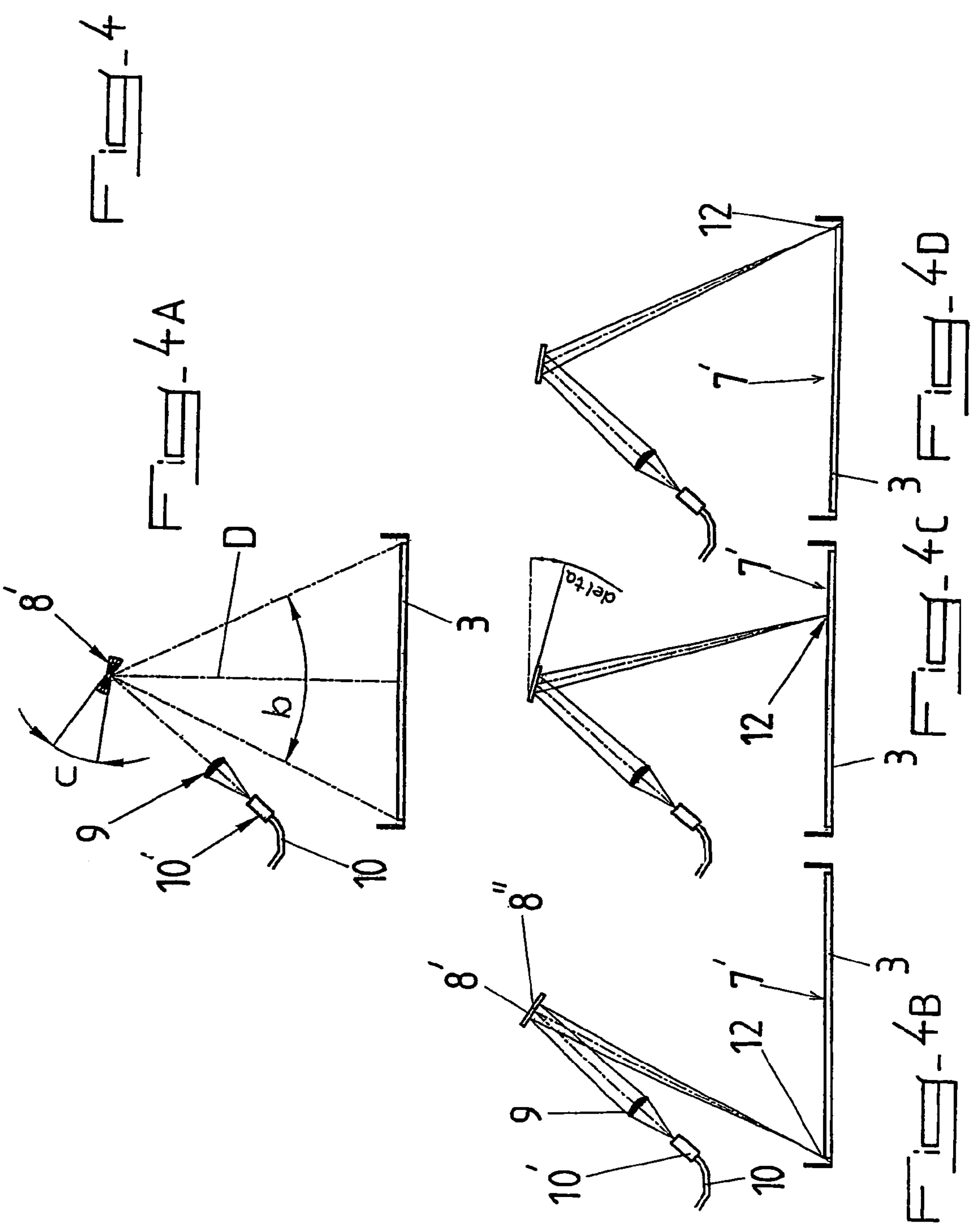
FIG. 4A is a schematic view of the functional members of the receiver head forming part of the machine according to the invention, and of the amplitude of the oscillations of the reflective member and the resultant scanning in the region of the detection zone.
FIGS. 4B to 4D show three positions of the moving elementary measuring zone during scanning of the detection zone.

Referring now to FIGS. 1, 2 and 4 of the accompanying drawings, the means 8, 9, 10 for reception and transmission of the light reflected in the region of the detection zone 7' will now be described in more detail.

The object is to analyse approximately 40 to 80 elementary surfaces within the zone 7' using a moving elementary measuring zone 12. These elementary surfaces 12' have a rectangular shape with dimensions of 10×20 to 20×20 mm. Such an elementary surface 12' will hereinafter be called a "pixel", all of said pixels corresponding to the detection zone 7'.

To minimise the number of sensors required, the inventors have selected a moving assembly which sequentially scans all the pixels. A single sensor therefore allows all the measurements, providing that measurement is carried out very rapidly.

The preferred solution is an oscillating mirror 8', 30 mm in diameter, which is mounted in a detection head 8 and oscillates with an angular amplitude c between the positions shown in FIG. 4A. Depending on the instantaneous angle delta (FIG. 4C), it returns the light from a pixel 12' toward the fixed lens 9 which focuses it in a bundle 10 of optical fibres 10". The pixel 12' has been shown as a dot so that FIG. 4 will be legible.

The number of measurements per second is obtained as a function of the speed of travel of the mat 3 and the selected pixel size. Thus, for example, with a pixel of 20 mm×20 mm, there are 40 measurements per line over a width of 800 mm. With a speed of travel of 2.5 m/s, there are 125 lines of 20 mm in width per second: 125×40=5000 measurements/second are therefore found. For geometric reasons, moreover, only half an oscillating alternation may be exploited. The duration of an individual measurement may therefore be $1(5000\times2)=10^{-4}$ sec=100 μs.

In view of this scanning, non-vertical angles of return of light are accepted. A sufficiently large height of the mirror 8' must therefore be selected to limit the angle b of the field of exploration C to a value of just below 60°. Experience has shown that the geometric aiming errors are acceptable for these angles. As any variation in angle $\alpha$ of a rotating mirror is manifested by a variation of $2.\alpha$ in the position of the reflected beam, the plane mirror can therefore oscillate over half an angle, or 30° in total.

The lens 9 is disposed as far as possible below the mirror 8' without interfering with the field of exploration C (angle b). It should not be too low above the conveying mat 3 either.

The design of the lighting with an empty space in the centre above the mat 3 is utilised to make the plane of oscillation of scanning Pb of the mirror 8' (comprising the field of exploration C) coincide with the lighting plane Pe (plane containing the focuses F and F') and passing through the median axis of the detection zone 7'. With suitably selected dimensions and arrangement, the measuring zone (angle b) does not interfere with the tubes 6" or the reflectors 6'.

This design is very advantageous for analysing objects 2 of significant height (up to 200 mm high) because, whatever the height of the object, the illuminated zone and the analysed zone coincide.

Although the lighting and the measuring spot are no longer focused if the surface of the object moves away from the point F', detection is reliable despite a reduction in the definition of the pixel, because the light intensity remains substantially identical. In fact, the lighting is dispersed well over a larger area but, at the same time, the object approaches the halogen tube and therefore receives a greater direct flux, and the distance between the mirror and object decreases, and this increases the density received on the mirror 8'.

In the designs of the known non-coplanar devices, the lighting has to be dispersed over a large angle to effectively light a high object, and the available intensity is reduced by the same amount.

To prevent the specular rays which lack information from being taken into consideration in the recovered reflected light flux, the common plane (lighting plane Pe and scanning plane Pb) of the lighting means 6 and the oscillating mirror 8' is inclined at an angle alpha relative to the perpendicular to the plane of conveyance Pc. It can thus be seen that there is an angle gamma between the closest specular ray and the axis of the sensor (axis comprising mirror 8'/lens 9/orifice 10'). This angle gamma must be at least 5°, preferably greater than 10° for high security (see FIG. 2 of the accompanying drawings).

Conversely, an excessive inclination alpha would reduce the quantity of useful light collected by the sensor. A good compromise seems to be an angle alpha of about 20°.

The lens 9 serves to limit the size of the analysed pixel 12', even at a great distance from the conveying mat 3.

It gives a clear image of the analysed pixel 12' at the inlet orifice 10' of the fibre bundle 10, providing that the end of the corresponding bundle at the orifice 10' is placed slightly downstream of the focal distance upstream of the lens 9. The magnification, in other words the ratio between the size of the pixel 12' and the size of the inlet 10' of the bundle 10 is equal to the ratio of the distances to the lens.

Under these conditions, the collected light flux is optimal. In fact, it can be shown mathematically that it is almost independent of the distance between the mirror and conveyor and that it is identical to the flux collected by a fibre bundle having the same surface area placed in the vicinity of the conveyor and under the same lighting and without an optical system.

The aforementioned existing single-material machines utilise 3 to 6 suitably selected PLOs. A PLO is defined by the value of a central wavelength and by a spectral width. For example, the PLO centred at 1420 nm and with a width of 20 nm is the range of all the wavelengths between 1410 and 1430 nm. The use of 3 to 6 PLOs is effectively sufficient to distinguish a given product from all the others. Experience has shown that it is insufficient to simultaneously recognise the range of materials commonly found in refuse, namely:

- the main plastics materials: PET, PVC, PE, PS, PP, PAN, PEN;
- so-called “engineered” plastics: ABS, PMMA, PA6, PA6.6, PU, PC;
- food packs (Tetrapaks), cardboards, of which the cellulose is detected;
- the other products, without a spectral signature: metals and glass.

Various technologies may be used to separate the PLOs:

- interferential filters,
- AOTFs (acousto optic tunable filters),
- diffraction grating.

The inventors adopted the third solution as it is tried-and-tested and is free from physical movements and has a very good light output: from 60 to 90% in the spectrum which is of interest here.

Figure 5:
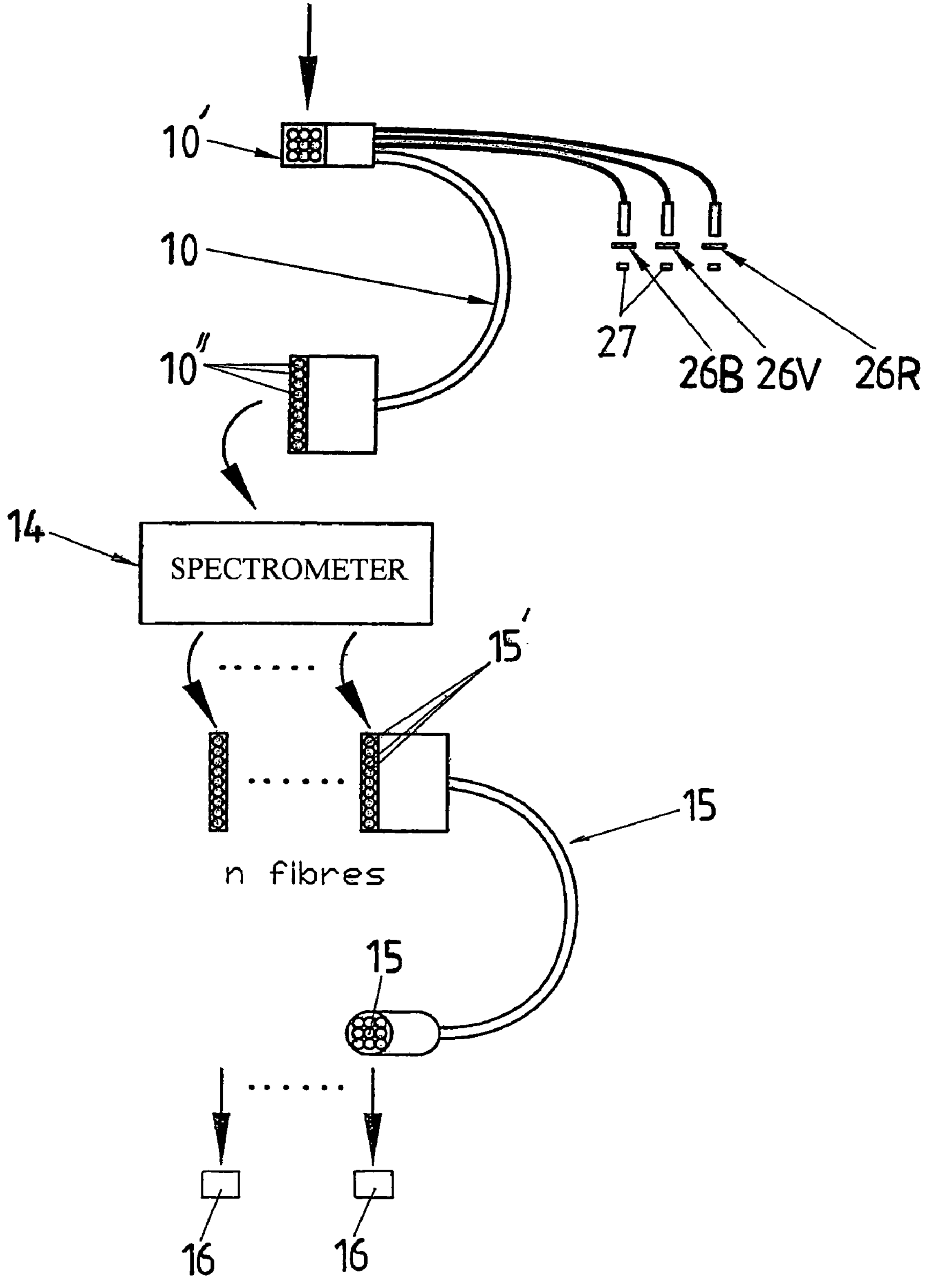
FIGS. 5 and 6 are partially schematic and partially structural views of the recovery and transmission means and of the analysis devices.
Figure 6:
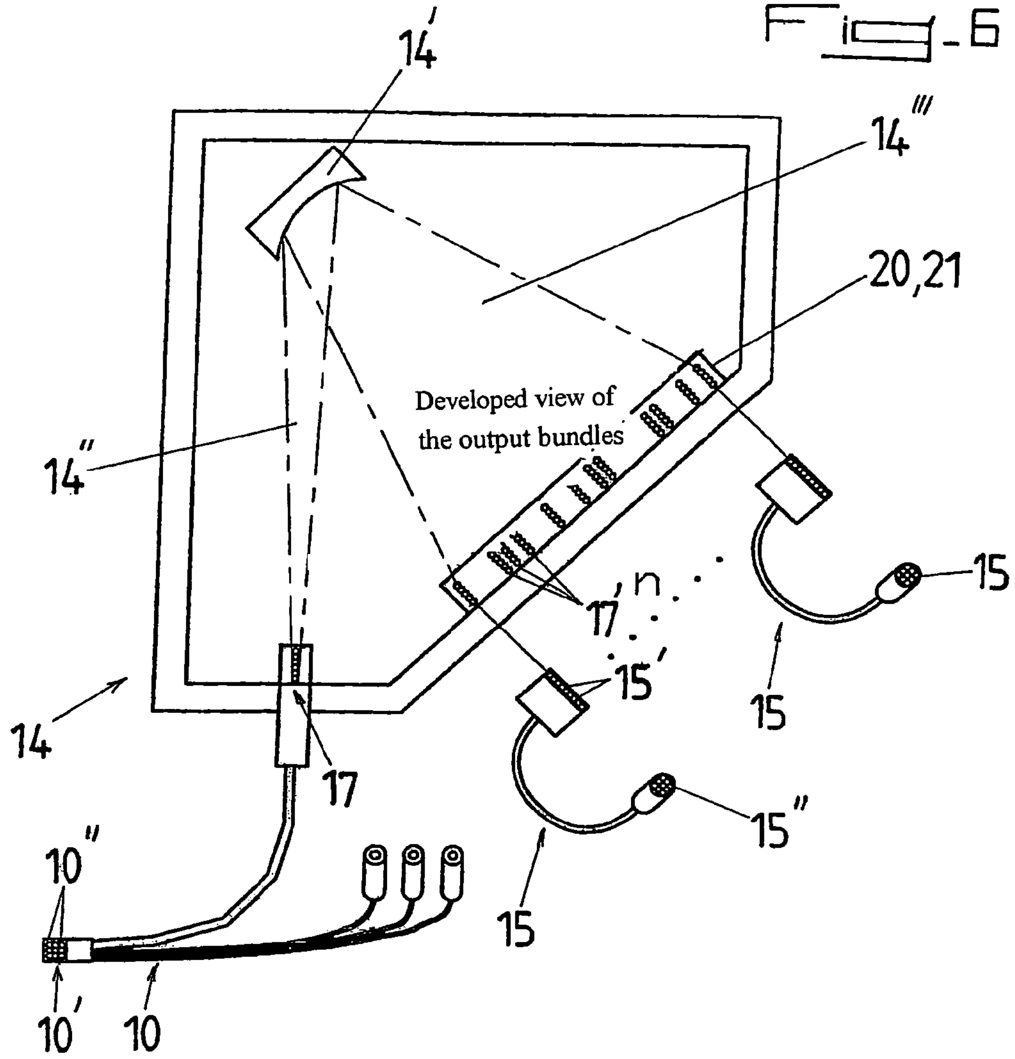

The following description refers to FIGS. 5 and 6 of the accompanying drawings.

In a diffraction grating, the light is dispersed through the outlet slot in the manner of a rainbow, depending on the wavelengths. The grating is characterised by a dispersion, which is the ratio between the changes of wavelengths expressed in nm, and the distance over the outlet slot, expressed in mm. For good resolution of analysis, the inventors have selected a dispersion of between 20 nm/mm and 30 nm/mm.

The bundle of optical fibres 10 allows the reflected light received from the pixel 12' to be conveyed (multispectral light flux 14") from the square section end comprising the orifice 10' (having a shape identical to the pixel) to the inlet slot 17 of the spectrometer 14 where the fibres are rearranged in a fine vertical slot 17'.

The image of the inlet slot 17 for each PLO selected at the outlet of the grating 14' is a slot 17' of the same shape and dimensions as at the inlet. The various elementary light fluxes 14'" corresponding to the various PLOs are collected by the outlet slots 17'. A grating of fibre bundles 15' forming reception and transmission means 15 is provided in this region, and these fibres are rearranged at the other end in circles 15", each of which is fixed to the contact of a photodiode 16 made of InGaAs having an approximate active surface area of 1 $mm^2$.

Advantageously, the spectral width of the PLOs is fixed and is about 5 nm, and this allows the use of identical photodiodes. However, bundles 15 of different sections combined with photodiodes 16 having a corresponding surface area (for example a spectral width of 10 nm with two rows of attached optical fibres in the case of a photodiode surface area of approximately 2 $mm^2$) may also be constructed. Therefore, the received light flux may be increased or the resolution refined, as desired.

Owing to the above-described assembly, the amount of light is divided only once: if the number of outlet bundles is doubled, each of them will have as much light as in the original assembly.

It is very advantageous that the construction of the machine 1 according to the invention allows the choice of the PLOs to be easily changed to optimise the search for new products which will appear on the market in future.

Figure 7:
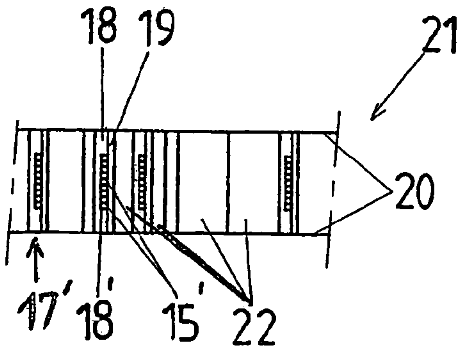
FIG. 7 is a partial front elevation of the end portions for ingress of the recovery and transmission means mounted in the outlet slots of the spectrometer forming part of the first analysis device.
Figure 8:
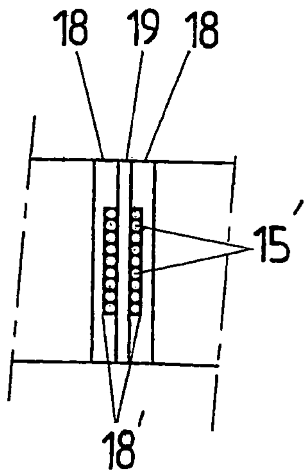
FIG. 8 shows a detail of a particular assembly of two adjacent inlet end portions of the recovery and transmission means.

The design adopted and shown in FIGS. 7 and 8 allows great flexibility for modifying the selected PLOs, provided that the number of them is fixed. The following technological solutions allows easy modification of assembly:

- the fibre bundles 15 are provided with precision-machined rectangular ferrules produced in two parts 18 and 19. It is therefore easy to handle them without breaking them. A ferrule of this type is formed from a first plate 18 with a recess 18' containing and blocking the ends of the optical fibres 15' and closed by a back plate 19.
- the minimum spacing between the ferrules defines the resolution of the system (FIG. 8), in other words the minimum deviation between two PLOs: it is determined by the size of these ferrules. In the extreme case, the protective plate or back plate 19 of one of the two ferrules may be eliminated, and this gives a wavelength deviation of 10 nm (FIG. 8).
- a set of shims 22 machined with high precision (tolerance of about +/−0.15 μm) is used to select arbitrary positioning of the ferrules in the outlet zone of the grating 14'. For example, a shim of 5000 μm and a shim of 280 μm result in a spacing of 5280 μm.

all the ferrules 18, 19 and the shims 22 are stacked in a support 20 fixed in a rectangular holding box 21 of appropriate shape.

Rearrangement of the PLOs therefore involves simply removing ferrules 18, 19 and shims 22 from the holding box 21 then replacing certain shims with shims of different dimensions, and finally replacing them in the box. Operation is simple, quick (a single operating session) and reversible.

The photodiodes of the conversion means 16 provide an intensity which is proportional to the number of photons incident on all their surface for a given period. This current is converted into voltage and amplified before being delivered to the computer 23.

The amplification means may comprise an integrating element which makes the final signal level proportional to the exposure time. A plurality of equivalent methods are possible:

a simple RC (resistance—capacitance) filter of which the time constant is adjusted so as to be about half the measuring time;

a charge transfer device (CCD) which empties a charge-accumulating capacitance at regular intervals;

a summation module which calculates an integral implanted in software after digital conversion.

The inventors preferred the first method, which is the simplest and the least restrictive for the computerised processing system 23.

The active surface of the photodiodes 16 used actually determines the entire design of the recovery/transmission/analysis assembly. In fact, it is not worth producing an outlet bundle 15 form the diffraction grating 14' which is greater than the surface of the associated diode 16: the additional surface would not be utilised. Similarly, the laws of optics mean that the dimensions of the inlet slot 17 of the grating 14' are the same as the dimensions of the outlet slot 17'. The bundle of optical fibres 10 obviously keeps the active surface unchanged, in other words about 1 $mm^2$. Finally, as stated hereinbefore, the flux received at the end of the inlet orifice 10' of this bundle depends only on its surface area and on the intensity of lighting in the region of the plane of conveyance Pc (for example surface of the mat of a conveyor 3), subject to suitable dimensioning of the optical system 8' and 9.

The outcome of the foregoing is that the final signal level for substance analysis is proportional only to the following variables:

the illuminated surface of the photodiode;

the intensity of lighting on the conveyor mat;

the spectral width of the PLO used;

the exposure time for each measurement.

Thus, an analysis system which is much faster but also much finer than could be produced with a bar-type spectrometer is obtained by maximising the intensity of lighting, by maintaining narrow PLOs and by using sensors (photodiodes) having a large illuminated surface area.

FIG. 5, in combination with FIG. 1, shows a possible embodiment of the second analysis device 11' (colour analysis).

This second device 11' could also be produced using a diffraction grating.

In the visible range, however, the wavelength selectivity does not have to be very fine. Bandwidths of 60 nm are quite sufficient. In addition, there is no issue of flexibility as the three basic colours are fixed in the perception of the human eye: therefore, the PLOs never change. Rather than using a diffraction grating, therefore, it is simpler and more cost effective to use coloured filters which may be placed in front of each receiving diode. These are the 26R, 26V, 26B filters shown, which are specific to red, green and blue respectively.

The photodiodes 27 associated with the aforementioned filters are made of silicon and cover the entire visible range: this material is very inexpensive and has very good detectivity, about 100 times greater than InGaAs in the infrared range. Owing to this high sensitivity, it is not worth bringing a bundle of fibres in front of the diode: a single fibre having a diameter of 200 μm gives an adequate signal.

It is therefore sufficient to take three optical fibres from the bundle 10 for use in colour detection. The end comprising the inlet orifice 10' may therefore comprise about 20 fibres, of which 16 or 17 are located at the end penetrating the inlet slot 17 of the spectrometer 14 and of which three penetrate the analysis device 11' or colour module. In view of the amount of visible light available, it is also possible to use a single fibre for the colour and to distribute its light over three filters: the maximum sensitive surface area is therefore left for the portion of the bundle 10 connected to the spectrometer 14.

After the silicon photodiodes 27, a conventional amplification stage, not shown, allows the analogue signals to be brought to a level which is sufficient to collect them in the computer 23.

The invention is obviously not limited to the embodiment described and shown in the accompanying drawings. Modifications are possible, in particular with regard to the constitution of the various elements or by substitution of technical equivalents without departing from the scope of protection of the invention.

The invention claimed is:

1. Machine for automatically inspecting objects travelling substantially in a single layer on or over a plane of conveyance of a conveyor, for discriminating between these objects by their chemical composition, said machine comprising at least one detection station through or beneath which the flow of objects passes, said detection station comprising:

means for applying electromagnetic radiation in the direction of the plane of conveyance, emitting said radiation so as to define a lighting plane, the intersection of said lighting plane and said plane of conveyance defining a lighting line extending transversely to the direction of travel of the objects, a receiver device periodically scanning each point on said lighting line and receiving radiation reflected by an elementary measuring zone located in the region of the point scanned at this instant, the plane defined by said lighting line and the optical input centre of said device being known as the detection plane, means for transmitting to at least one analysis device said radiation reflected in the region of the scanning elementary measuring zone, wherein the emitted radiation is concentrated in the region of the lighting plane and wherein said lighting plane and the detection plane coincide as a common plane being inclined to the perpendicular to the plane of conveyance.

2. Machine according to claim 1, characterised in that the receiver device (8) comprises a moving reflective member (8') carrying the optical input centre (8"), directly receiving the radiation reflected in the region of the scanning elementary measuring zone (12) and having dimensions which are substantially equal to the dimensions of said elementary measuring zone (12) which it displaces, preferably substantially greater.

3. Machine according to claim 1, characterised in that the application means consist of broad spectrum lighting means, the applied radiation consisting of a mixture of electromagnetic radiation in the visible range and in the infrared range and in that said lighting means comprise members which concentrate the emitted radiation in the region of the plane of conveyance on a transverse detection strip (7') periodically scanned by the elementary measuring zone and of which the longitudinal median axis corresponds to the lighting line.

4. Machine according to claim 1, characterised in that the means (6) for application of radiation consist of two mutually spaced application units disposed in an alignment which is transverse to the direction of travel of the objects (2), each unit comprising an elongate emission member (6") combined with a member (6') in the form of a profiled reflector of elliptical section.

5. Machine according to claim 4, characterised in that each elongate emission member (6") is positioned substantially in the region of the near focus (F) of the reflector (6') associated therewith, the means for applying radiation (6) being positioned and the reflectors (6') being shaped and dimensioned in such a way that the second, remote focus (F') is located at a distance from the plane of conveyance (3) substantially corresponding to the mean height (H) of the objects (2) to be sorted, said focuses (F, F') being located in the lighting plane (Pe).

6. Machine according to claim 3, characterised in that walls (13, 13') reflecting the radiation emitted by the application means (6) are disposed along the lateral edges of the conveyor (3), in particular in the region of the ends of the detection strip (7'), and extend horizontally and vertically, substantially to the height of said application means (6).

7. Machine according to claim 3, characterised in that the receiver device (8) is in the form of a receiver head carrying, on the one hand, a moving reflective member (8') in the form of a plane mirror disposed substantially centrally relative to the plane of conveyance (Pc) of the conveyor (3) and oscillating by pivoting with a range which is sufficient for the moving elementary measuring zone (12) to explore the entire detection strip (7') during a half-oscillation and, on the other hand, a means (9) for focusing the fraction of radiation reflected by an elementary portion of the detection strip (7') and transmitted by the oscillating mirror (8') in the direction of said means (9), said head (8) also carrying the end which has the inlet orifice (10') of the means (10) for transmitting said fraction of radiation, after it has been focused by the means (9), toward at least one spectral analysis device (11, 11').

8. Machine according to claim 7, characterised in that the focusing means (9) and the successive transmission means (10) are located outside the field of exploration (C) of the oscillating mirror (8') located in the scanning plane (Pb), the axis of alignment of the mirror (8')/focusing means (9)/inlet orifice (10') being located in said scanning plane (Pb).

9. Machine according to claim 7, characterised in that the oscillating plane mirror forming the moving reflective member (8') is located between the two units forming the means for applying radiation (6) and in a relative disposition which is such that said units do not interfere with the field of exploration (C) of said mirror (8').

10. Machine according to claim 1, characterised in that the transmission means (10) consist of a bundle of optical fibres (10") all or the majority of which are connected to an analysis device (11) which breaks down the reflected radiation into its various spectral components and determines the intensities of some of said components having wavelengths which are characteristic of the substances of the objects to be sorted, said optical fibres (10") having a square or rectangular section arrangement in the region of the inlet orifice (10').

11. Machine according to claim 10, characterised in that a minority of the optical fibres (10") of the beam (10) is connected to an analysis device (11') which detects the respective intensities of the three basic colours.

12. Machine according to claim 10, characterised in that the analysis device (11) consists, on the one hand, of a spectrometer (14) with a diffraction grating (14') which breaks down the multispectral light flux (14") received from the elementary measuring zone (12) into its various constituent spectral components, in particular into the infrared range, on the other hand, of means (15) for recovering and transmitting the elementary light fluxes (14'") corresponding to various unevenly spaced ranges of the spectrum, characterising the chemical substances and compounds of the objects (2) to be discriminated, for example in the form of separate bundles of optical fibres and, finally, of photoelectric conversion means (16) which deliver an analogue signal for each of said elementary light fluxes (14'").

13. Machine according to claim 12, characterised in that the multispectral light flux (14") is introduced into the spectrometer (14) in the region of an inlet slot (17) and in that the elementary light fluxes (14'") are recovered in the region of outlet slots (17') having a shape and dimensions identical to those of the inlet slot and positioned as a function of the dispersion factor and of the ranges of the spectrum to be recovered, the end portions for the egress of the fibres (10") of the major component of the fibre bundle forming the transmission means (10) and the end portions for the ingress of the optical fibres (15') of the recovery and transmission means (15) having identical linear arrangements and being mounted in the inlet slot (17) and the outlet slots (17') respectively.

14. Machine according to claim 13, characterised in that the end portions for ingress of the optical fibres (15') of the bundles forming the recovery and transmission means (15) are mounted in thin plates (18) provided with appropriate receiving recesses (18') preferably combined with holding and locking back-plates (19) so as to form assembly and positioning supports (20) for said optical fibres (15') in the body of the spectrometer (14).

15. Machine according to claim 14, characterised in that the body of the spectrometer (14) comprises a rigid receiving and holding structure (21) with locking for said supports (20), which enables them to be positioned by sliding and to be installed by stacking, optionally with insertion of appropriate shims (22) so as to position said supports (20) in the locations corresponding to the impact zones of the elementary light fluxes (14'") to be recorded.

16. Machine according to claim 3, characterised in that it also comprises a unit (23) for processing and managing operation of the detection station (4) such as a computer controlling, in particular, the movement of the moving reflective member (8') and optionally of the conveyor (3), sequencing the acquisition of the radiation reflected in the region of the moving elementary measuring zone (12) and processing and evaluating the signals transmitted by the analysis devices (11, 11'), for example by comparison with programmed data, in order to determine the chemical composition of each of the inspected objects (2) or the presence of a chemical substance in said objects (2), by correlating the results of said determination with determination of the spatial location of said objects (2) as the case may be.

17. Machine according to claim 16, characterised in that the detection strip (7') has the form of an elongate rectangular surface of small width extending perpendicularly to the median axis and transversely over the entire width of the plane of conveyance (Pc) of the conveyor (3).

18. Machine for automatically sorting objects according to their chemical composition, these objects travelling substantially in a single layer on a conveyor, this sorting machine comprising an upstream detection station which is functionally coupled to a downstream station for active separation of said objects as a function of the results of the measurements and/or analyses effected by said detection station, characterised in that the detection station (4) is a detection station according to claim 1.

19. Sorting machine according to claim 18, characterised in that the detection station (4) or its unit (23) for processing and managing operation transmit actuating signals to a control module (24) for the ejection means (5') in transverse alignment of the active separation station (5) as a function of the results of said analyses, a salvo of actuating signals being emitted after each complete exploration of a transverse detection strip (7') by the moving elementary measuring zone (12).

20. Sorting machine according to claim 18, characterised in that the detection line (7) is located in the immediate vicinity of, for example at less than 30 cm from the ejection means (5'), for example by lifting, in the form of a row of nozzles which deliver jets of gas, preferably air.

21. Method for automatically inspecting objects travelling substantially in a single-layer on or over a plane of conveyance of a conveyor, said method allowing discrimination between said objects by their chemical composition and comprising:

passing the flow of objects to be inspected through or beneath at least one detection station, emitting electromagnetic radiation toward the plane of conveyance via corresponding application means so as to define a lighting plane, the intersection of said lighting plane and said plane of conveyance defining a lighting line extending transversely to the direction of travel of the objects, periodically scanning any point on said lighting line via a receiver device which receives, at any instant, the radiation reflected by an elementary measuring zone located in the region of the point scanned at this instant, the plane defined by said lighting line and the optical input centre of said device being known as the detection plane, transmitting said radiation reflected in the region of the scanning elementary measuring zone to at least one analysis device via appropriate transmission means, wherein the radiation emitted is concentrated in the region of the lighting plane and wherein said lighting plane and the detection plane are combined as a common plane being inclined to the perpendicular to the plane of conveyance.

22. Method according to claim 21, characterised in that it involves concentrating the radiation, preferably in the visible and infrared range, in the region of the plane of conveyance on a transverse detection strip which is periodically scanned by the elementary measuring zone and of which the longitudinal median axis corresponds to the lighting line, so as to obtain high intensity of radiation which is substantially uniform over the entire surface of said detection strip.

23. Method according to claim 21, characterised in that it involves sequentially scanning the detection strip (7') with the moving elementary measuring zone (12) by pivoting oscillation of a plane mirror forming the reflective member (8'), focusing the light flux originating from the elementary measuring zone (12) on the inlet orifice (10') of the transmission means (10) in the form of a bundle of optical fibres (10"), bringing the majority of the captured multispectral light flux (14") toward the inlet slot (17) of a spectrometer (14) forming part of a first means of analysis (11), breaking down this light flux (14") into its various elementary spectral components (14'"), recovering the light fluxes of some of these components corresponding to specific narrow wavelength ranges in the region of outlet slots (17') and transmitting them via appropriate means (15) to photoelectric conversion means (16) in order to supply first measuring signals, simultaneously to bring, as the case may be, a small portion of the captured multispectral light flux (14") toward a second analysis means (11') determining the respective intensities of the three basic colours and supplying second measuring signals, processing said first and optionally second measuring signals in the region of a computerised processing and management unit (23) controlling, in particular, the movement of the moving reflective member (8'), sequencing the acquisition of the radiation reflected in the region of the moving elementary measuring zone (12) and processing and evaluating the signals transmitted by the analysis devices (11, 11') by comparison with programmed data in order to determine the chemical composition of each of the inspected objects (2) or the presence of a chemical substance in said objects (2).

24. Method according to claim 23, characterised in that it involves causing the unit (23) to transmit, as a function of the results of processing of the measuring signals, actuating signals to a module (24) for controlling ejection means (5') of a separation station (5') located downstream of the detection station (4) relative to the flow of objects (2) and, finally, ejecting or not ejecting each of the various objects (2) travelling on the supporting plane of conveyance (Pc) of the conveyor (3) as a function of the transmitted actuating signals.

25. Method according to claim 24, characterised in that a salvo of actuating signals is emitted on completion of each scanning of the detection strip (7') and processing of the corresponding measuring signals, taking into account the measuring signals of the previous scanning as the case may be.

* * * * *